United States Patent
Kobayashi

(10) Patent No.: US 9,154,752 B2
(45) Date of Patent: Oct. 6, 2015

(54) IMAGE DISPLAY DEVICE AND IMAGE DISPLAY METHOD

(75) Inventor: Masaaki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 13/095,186

(22) Filed: Apr. 27, 2011

(65) Prior Publication Data

US 2011/0292289 A1    Dec. 1, 2011

(30) Foreign Application Priority Data

May 28, 2010    (JP) .................................. 2010-123296

(51) Int. Cl.
  *G09G 5/00*    (2006.01)
  *H04N 9/31*    (2006.01)

(52) U.S. Cl.
  CPC .................................. *H04N 9/3126* (2013.01)

(58) Field of Classification Search
  CPC .................. G09G 2300/02; G09G 2340/0435; G06F 3/1423; G06F 3/147; H04N 9/3126
  USPC .................................. 345/1.1–9, 204, 84, 87
  See application file for complete search history.

(56) References Cited

U.S. PATENT DOCUMENTS

| 2009/0147186 A1* | 6/2009 | Nakai et al. .................. 349/74 |
| 2010/0118214 A1 | 5/2010 | Yoshimura |
| 2011/0158697 A1 | 6/2011 | Iwata et al. |
| 2011/0164049 A1 | 7/2011 | Kobayashi |

FOREIGN PATENT DOCUMENTS

| JP | 08-171098 A | 7/1996 |
| JP | 2009-116098 A | 5/2009 |

OTHER PUBLICATIONS

U.S. Appl. No. 12/962,982, filed Dec. 8, 2010; Applicant: Masaaki Kobayashi.

* cited by examiner

*Primary Examiner* — Jimmy H Nguyen
(74) *Attorney, Agent, or Firm* — Fitzpatrick, Cella, Harper & Scinto

(57) ABSTRACT

A spatial maximum value filter generates a low frequency video signal in an intermittent frame by removing high frequency components from a video signal in the intermittent frame. A division signal extraction unit calculates a ratio of a signal value of a video signal in an acquired frame to a signal value of a low frequency video signal in an intermittent frame closest to the acquired frame, and generates a high frequency video signal having the calculated ratio as a signal value. A signal adjustment unit calculates a ratio of a signal value of the video signal in the intermittent frame to a signal value of a high frequency video signal in the intermittent frame, and generates an adjusted low frequency video signal having the calculated ratio as a signal value.

12 Claims, 5 Drawing Sheets

IMAGE DISPLAY DEVICE AND IMAGE DISPLAY METHOD

BACKGROUND OF THE INVENTION

1. Field of the Invention

The present invention relates to a technique for improving dynamic characteristics of an image projected by, for example, a projector.

2. Description of the Related Art

A projected video upon projecting a video by a liquid crystal projector suffers problems related to low contrast and low dynamic characteristics due to floating blacks. Deterioration of dynamic characteristics are caused by a long time period required for an orientation change of liquid crystal elements which determine the transmission amount of light when a luminance level of a pixel in a video signal changes; that is, a long time period is required until the luminance level of projected light becomes stable.

According to Japanese Patent Laid-Open No. 2009-116098, two light modulation systems are provided, and light coming from a light source undergoes double light modulations, so as to suppress floating blacks and to realize high contrast. However, even this system cannot improve dynamic characteristics. According to Japanese Patent Laid-Open No. 8-171098, for example, a general normally white liquid crystal element has characteristics in which a luminance change from white to black is faster than a change between intermediate tones.

In either case, even with the related arts, the dynamic characteristics of a video image projected by a liquid crystal projector remain low.

SUMMARY OF THE INVENTION

The present invention has been made in consideration of the aforementioned problems, and provides a technique for improving the dynamic characteristics of an image projected by, for example, a projector.

According to the first aspect of the present invention, an image display device, which comprises a first display panel and a second display panel, and forms, on a screen, an image displayed on the first display panel and an image displayed on the second display panel to be superposed with each other, comprising: an acquisition unit which acquires video signals of successive respective frames; a first generation unit which generates, letting an intermittent frame be every other frame of the successive respective frames, a low frequency video signal of the intermittent frame by removing high frequency components from a video signal of the intermittent frame; a second generation unit which performs, for the successive respective frames, an operation for calculating a ratio of a signal value of a video signal of an acquired frame acquired by the acquisition unit to a signal value of the low frequency video signal of the intermittent frame closest to the acquired frame, generating a high frequency video signal having the calculated ratio as a signal value, and outputting the generated high frequency video signal to the first display panel as the acquired frame; and a third generation unit which calculates a ratio of a signal value of the video signal of the intermittent frame to a signal value of the high frequency video signal of the intermittent frame, generates an adjusted low frequency video signal having the calculated ratio as a signal value, and outputs the generated adjusted low frequency video signal to the second display panel as the intermittent frame.

According to the second aspect of the present invention, an image display device, which comprises a first display panel and a second display panel, and forms, on a screen, an image displayed on the first display panel and an image displayed on the second display panel to be superposed with each other, comprising: an acquisition unit which acquires video signals of successive respective frames; a first generation unit which generates, letting an intermittent frame be every other frame of the successive respective frames, a low frequency video signal of the intermittent frame by removing high frequency components from a video signal of the intermittent frame; a second generation unit which performs, for the successive respective frames, an operation for calculating a difference value between a signal value of a video signal of an acquired frame acquired by the acquisition unit and a signal value of the low frequency video signal of the intermittent frame closest to the acquired frame, generating a high frequency video signal having the calculated difference value as a signal value, and outputting the generated high frequency video signal to the first display panel as the acquired frame; and a third generation unit which calculates a difference value between a signal value of the high frequency video signal of the intermittent frame and a signal value of the video signal of the intermittent frame, generates an adjusted low frequency video signal having the calculated difference value as a signal value, and outputs the generated adjusted low frequency video signal to the second display panel as the intermittent frame.

According to the third aspect of the present invention, an image display method executed by an image display device, which comprises a first display panel and a second display panel, and forms, on a screen, an image displayed on the first display panel and an image displayed on the second display panel to be superposed with each other, comprising: an acquisition step of acquiring video signals of successive respective frames; a first generation step of generating, letting an intermittent frame be every other frame of the successive respective frames, a low frequency video signal of the intermittent frame by removing high frequency components from a video signal of the intermittent frame; a second generation step of performing, for the successive respective frames, an operation for calculating a ratio of a signal value of a video signal of an acquired frame acquired in the acquisition step to a signal value of the low frequency video signal of the intermittent frame closest to the acquired frame, generating a high frequency video signal having the calculated ratio as a signal value, and outputting the generated high frequency video signal to the first display panel as the acquired frame; and a third generation step of calculating a ratio of a signal value of the video signal of the intermittent frame to a signal value of the high frequency video signal of the intermittent frame, generating an adjusted low frequency video signal having the calculated ratio as a signal value, and outputting the generated adjusted low frequency video signal to the second display panel as the intermittent frame.

According to the fourth aspect of the present invention, an image display method executed by an image display device, which comprises a first display panel and a second display panel, and forms, on a screen, an image displayed on the first display panel and an image displayed on the second display panel to be superposed with each other, comprising: an acquisition step of acquiring video signals of successive respective frames; a first generation step of generating, letting an intermittent frame be every other frame of the successive respective frames, a low frequency video signal of the intermittent frame by removing high frequency components from a video signal of the intermittent frame; a second generation step of performing, for the successive respective frames, an operation for calculating a difference value between a signal value of a video signal of an acquired frame acquired in the acquisition step and a signal value of the low frequency video signal of the intermittent frame closest to the acquired frame, generating a high frequency video signal having the calculated difference value as a signal value, and outputting the generated high frequency video signal to the first display panel as the acquired frame; and a third generation step of calculating a difference value between a signal value of the high frequency video signal of the intermittent frame and a signal value of the video signal of the intermittent frame, generating an adjusted low frequency video signal having the calculated difference value as a signal value, and outputting the generated adjusted low frequency video signal to the second display panel as the intermittent frame.

According to the fifth aspect of the present invention, an image display device, which comprises a first display panel and a second display panel, and forms, on a screen, an image displayed on the first display panel and an image displayed on the second display panel to be superposed with each other, comprising:

a) an acquisition unit which acquires video signals of successive respective frames;

b) a generation unit which generates high frequency video signals and low frequency video signals by applying filter processing to the video signals of the successive respective frames; and c) an output unit which outputs the low frequency video signals to the first display panel, and outputs the high frequency video signals to the second display panel.

According to the sixth aspect of the present invention, an image display method executed by an image display device, which comprises a first display panel and a second display panel, and forms, on a screen, an image displayed on the first display panel and an image displayed on the second display panel to be superposed with each other, comprising:

a) an acquisition step of acquiring video signals of successive respective frames;

b) a generation step of generating high frequency video signals and low frequency video signals by applying filter processing to the video signals of the successive respective frames; and c) an output step of outputting the low frequency video signals to the first display panel, and outputting the high frequency video signals to the second display panel.

Further features of the present invention will become apparent from the following description of exemplary embodiments with reference to the attached drawings.

DESCRIPTION OF THE EMBODIMENTS

Embodiments of the present invention will be described hereinafter with reference to the accompanying drawings. Note that embodiments to be described hereinafter are examples when the present invention is practiced, and are some of practical embodiments of the arrangements described in the scope of the claims.

First Embodiment

Figure 1:
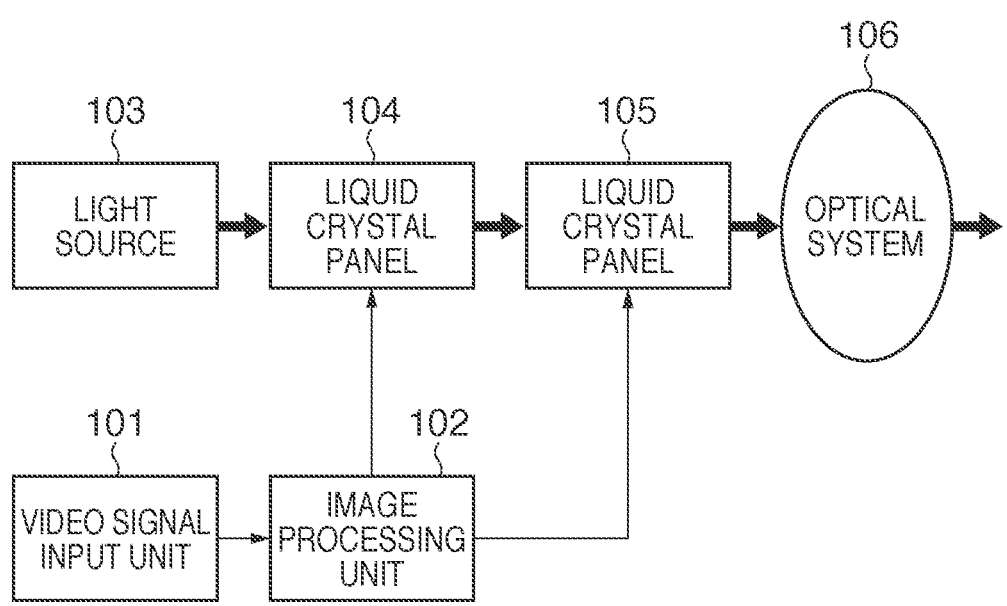
FIG. 1 is a block diagram showing an example of the hardware arrangement of a projector device.

A projector device as an image display device according to this embodiment, which improves dynamic characteristics of a moving image including continuous frames, and then projects images of respective frames which configure this moving image, will be described below using FIG. 1 which shows an example of the hardware arrangement of this projector device. Note that the projector device according to this embodiment is a double-modulation projector device.

A video signal input unit 101 acquires video signals of images of continuous frames which are output from an external device sequentially (in a playback order) at an input frequency f (in this embodiment, for example, 120 Hz), and sequentially outputs the acquired video signals of the respective frames to an image processing unit 102.

The image processing unit 102 separates the video signals of the respective frames into low and high frequency video signals. Then, the image processing unit 102 outputs the low frequency video signals to a liquid crystal panel 104 (second display panel) at a frequency of 60 Hz, and outputs the high frequency video signals to a liquid crystal panel 105 (first display panel) at a frequency of 120 Hz.

Each of the liquid crystal panels 104 and 105 converts each video signal received from the image processing unit 102 into transmittances of respective pixels, and allows light coming from a light source 103 to transmit through itself according to the converted transmittances, thereby projecting the light onto an external screen via an optical system 106.

Figure 2:
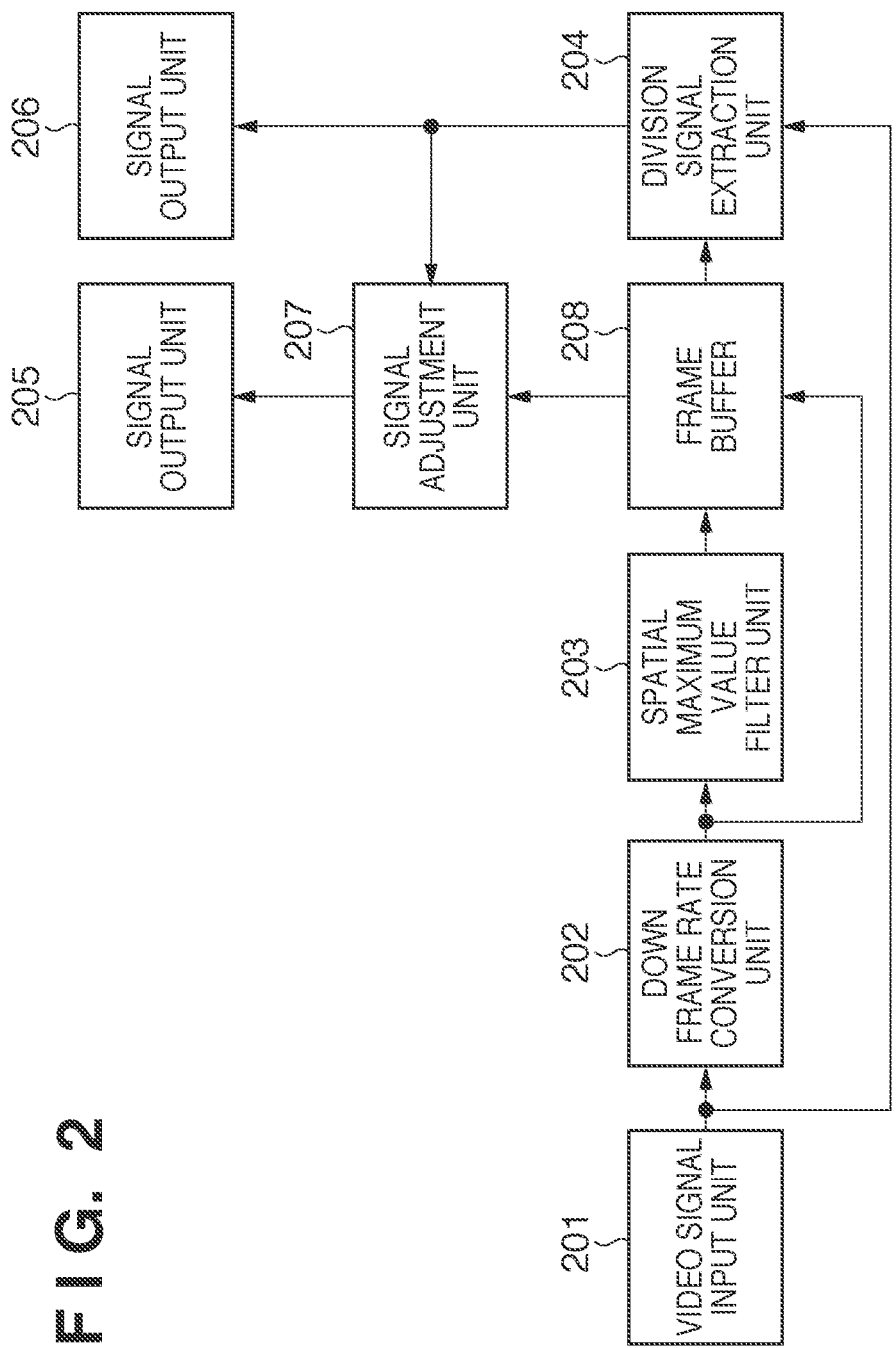
FIG. 2 is a block diagram showing an example of the hardware arrangement of an image processing unit 102.

An example of the hardware arrangement of the image processing unit 102 will be described below with reference to FIG. 2. The image processing unit 102 receives a video signal of each frame in a given processing unit. In the following description, assume that the image processing unit 102 receives a video signal for each pixel. Alternatively, the image processing unit 102 may receive a video signal in either one of processing units; that is, a video signal for each line or for each region having a predetermined area.

A video signal input unit 201 acquires a video signal $I(x, y, t)$ for each pixel from the video signal input unit 101. In this case, the video signal $I(x, y, t)$ indicates a video signal of a pixel at a coordinate position $(x, y)$ in an image of a t-th frame (acquired frame), and its signal value indicates a luminance value. The video signal input unit 201 outputs the acquired video signal $I(x, y, t)$ to a subsequent down frame rate conversion unit 202 and division signal extraction unit 204.

When the video signal $I(x, y, t)$ received from the video signal input unit 201 is a video signal in an even frame, the down frame rate conversion unit 202 outputs this video signal $I(x, y, t)$ to a spatial maximum value filter unit 203 and frame buffer 208. On the other hand, when the video signal $I(x, y, t)$ received from the video signal input unit 201 is a video signal in an odd frame, the down frame rate conversion unit 202 does not output the video signal $I(x, y, t)$ to the spatial maximum value filter unit 203 and frame buffer 208. That is, when a variable t assumes an even value, the down frame rate conversion unit 202 outputs the video signal $I(x, y, t)$ to the spatial maximum value filter unit 203 and frame buffer 208, and when the variable t assumes an odd value, it does not output the video signal $I(x, y, t)$ to the spatial maximum value filter unit 203 and frame buffer 208.

Note that contrary to the above description, a video signal in an odd frame may be output to the subsequent spatial maximum value filter unit 203 and frame buffer 208, and that in an even frame may not be output to them. That is, assuming that every other frame of continuous frames is defined as an intermittent frame, when a video signal of this intermittent frame is output to the spatial maximum value filter unit 203 and frame buffer 208, a video signal in a frame other than the intermittent frame is not output. On the other hand, when a video signal of an intermittent frame is not output to the spatial maximum value filter unit 203 and frame buffer 208, a video signal in a frame other than the intermittent frame is output. In this way, the down frame rate conversion unit 202 outputs a video signal of every other frame to the subsequent spatial maximum value filter unit 203 and frame buffer 208.

The spatial maximum value filter unit 203 applies a known maximum value filter (for example, a maximum value filter having a 5×5 size) to the video signal I(x, y, t) received from the down frame rate conversion unit 202. Thus, the spatial maximum value filter unit 203 generates a low frequency video signal Ld(x, y, t) by removing high frequency components from this video signal I(x, y, t) (first generation). Then, the spatial maximum value filter unit 203 stores the generated low frequency video signal Ld(x, y, t) in the subsequent frame buffer 208.

Thus, the frame buffer 208 stores the video signal I(x, y, t) and the low frequency video signal Ld(x, y, t) generated from this video signal I(x, y, t). As described above, both the stored signals are those in the even frame.

The division signal extraction unit 204 calculates equation (1) below using the video signal I(x, y, t) received from the video signal input unit 201 and a [low frequency video signal Ld(x, y, t') in a frame t' closest to the frame t] stored in the frame buffer 208:

$$H_d(x, y, t) = \begin{cases} \text{Min}(1, I(x, y, t)/L_d(x, y, t')) & \text{if } L_d(x, y, t') \neq 0 \\ 0 & \text{if } L_d(x, y, t') = 0 \end{cases} \quad (1)$$

In this case, when t assumes an even value, t'=t; when t assumes an odd value, t'=t−1. According to this equation (1), when a signal value of the low frequency video signal Ld(x, y, t') stored in the frame buffer 208 is not zero, a ratio of a signal value of the video signal I(x, y, t) to this signal value is calculated. Then, the calculated ratio is compared with a value "1", and a smaller value is used as a signal value of a high frequency video signal Hd(x, y, t) (second generation). Note that when the signal value of the low frequency video signal Ld(x, y, t') is zero, the signal value of the high frequency video signal Hd(x, y, t) is set to be zero.

In this way, equation (1) calculates the signal value of the high frequency video signal Hd(x, y, t) by making a division of the signals, and suppresses a division result (the signal value of the high frequency video signal Hd(x, y, t)) from overflowing.

Note that an equation used to calculate the ratio is not limited to equation (1). That is, letting p be the signal value of the video signal I(x, y, t), q be that of the low frequency video signal Ld(x, y, t'), and α and β be nonzero constants, a calculation result of (p+α)/(q+β) can be used as a ratio of p to q.

The division signal extraction unit 204 outputs the high frequency video signal Hd(x, y, t) having the signal value calculated based on equation (1) to a subsequent signal output unit 206 and signal adjustment unit 207. That is, since the high frequency video signal Hd(x, y, t) is output to the signal output unit 206 and signal adjustment unit 207 for each of continuous frames, this output frequency is the same as the aforementioned input frequency (=120 Hz).

The signal adjustment unit 207 calculates equation (2) below using a [video signal I(x, y, t'') in a frame t''] stored in the frame buffer 208 and a high frequency video signal Hd(x, y, t'') from the division signal extraction unit 204 (third generation):

$$L_d'(x,y,t'')=I(x,y,t'')/H_d(x,y,t'') \quad (2)$$

In this case, t'' assumes an even value. Therefore, equation (2) calculates a ratio of a signal value of the video signal I(x, y, t'') in an even frame to that of the high frequency video signal Hd(x, y, t'') in that frame to yield an adjusted low frequency video signal Ld'(x, y, t'') having the calculated ratio as a signal value. More generally, equation (2) calculates a ratio of a signal value of a video signal in the intermittent frame to that of a high frequency video signal in the intermittent frame, and generates an adjusted low frequency video signal having the calculated ratio as a signal value as a video signal in the intermittent frame. This equation (2) distributes a luminance value on the high frequency video signal side, which is lowered due to the above overflow suppression, to the low frequency video signal side.

That is, when the high frequency video signal Hd(x, y, t) received from the division signal extraction unit 204 belongs to an even frame (t assumes an even value), the signal adjustment unit 207 operates; when that signal belongs to an odd frame (t assumes an odd value), it does not operate.

Then, the signal adjustment unit 207 outputs the calculated low frequency video signal Ld'(x, y, t'') to a signal output unit 205. Note that the signal adjustment unit 207 generates the signal Ld'(x, y, t'') for an even frame, and outputs it to the signal output unit 205, as described above, but it does not generate any signal Ld'(x, y, t'') for an odd frame, and outputs nothing to the signal output unit 205. On the other hand, the division signal extraction unit 204 outputs high frequency video signals to the signal output unit 206 for respective frames. Hence, a ratio of a frame rate of high frequency video signals to that of low frequency video signals is 2:1.

The signal output units 205 and 206 operate in synchronism with each other for respective frames. When t assumes an even value, the signal output unit 205 outputs a signal Ld'(x, y, t), and the signal output unit 206 outputs a signal Hd(x, y, t) at the same time. On the other hand, when t assumes an odd value, the signal output unit 205 outputs nothing, and the signal output unit 206 outputs a signal Hd(x, y, t). An output destination of the signal output unit 205 is the liquid crystal panel 104, and that of the signal output unit 206 is the liquid crystal panel 105.

Figure 5:
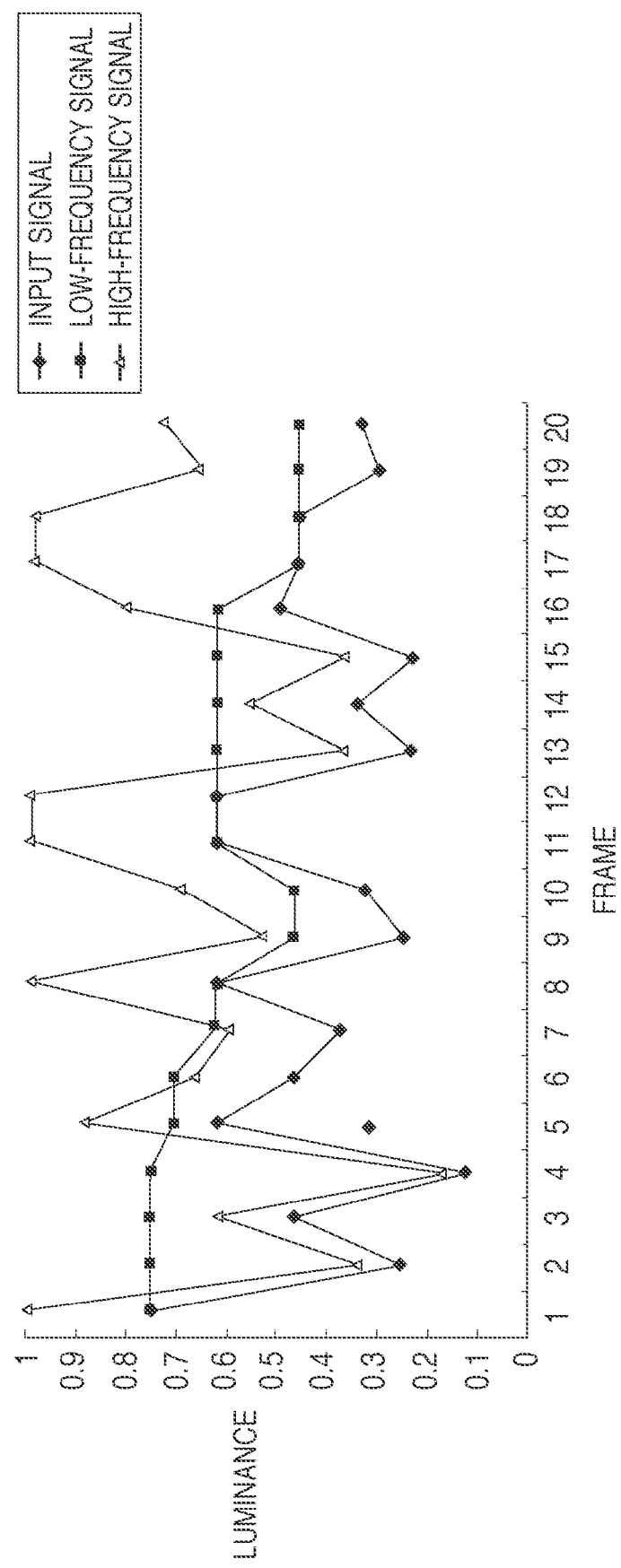
FIG. 5 is a graph showing an example of luminance variations.

According to the aforementioned arrangement, a low frequency video signal suffers less luminance variation since it is converted into a video frame rate of 60 Hz, and is applied with the spatial maximum value filter. Conversely, a high frequency video signal suffers a larger luminance variation than an input video signal. FIG. 5 shows an example of the luminance variations at that time.

In this manner, according to this embodiment, a luminance change on the liquid crystal panel 104 is reduced, and the dynamic characteristics of a projected image due to low response characteristics of the liquid crystal panel 104 can be suppressed from lowering. Also, since an intermediate luminance change on the liquid crystal panel 105 is reduced, and the response characteristics can be improved, an effect of reducing motion blurs can also be provided. Also, an effect of suppressing floating blacks and improving the contrast in a conventional double-modulation type projector can be maintained.

Note that this embodiment uses the transmission type liquid crystal panel as a light modulation unit. However, the present invention is not limited to such specific liquid crystal panel which is applicable to the light modulation unit. For example, a reflection type liquid crystal panel or DMD (Digital Micromirror Device) may be used. For example, a transmission type liquid crystal panel may be used as the liquid crystal panel 104, and a DMD may be used as the liquid crystal panel 105.

Also, this embodiment has explained the input frequency as 120 Hz. Of course, an input frequency of, for example, 100 Hz or 60 Hz may be used. A frame rate up-converter may be arranged between the video signal input unit 101 and image processing unit 102, and a video signal which is input to the video signal input unit 101 at an input frequency of 60 Hz may be converted into a video signal of 120 Hz by this frame rate up-converter.

In this embodiment, the spatial maximum value filter unit 203 generates a low frequency video signal using the maximum value filter. However, a method of generating a low frequency video signal is not limited to this. For example, a low frequency video signal may be generated using a method of converting a resolution to a lower resolution or convolving a Gaussian kernel. Also, the present invention is not limited to generation of spatial low frequency components, and low frequency components may be generated by applying a filter in a time direction.

Equations (1) and (2) above are designed under the assumption that a video signal has a linear nature. Therefore, when a video signal has a nonlinear nature, these equations (1) and (2) may be applied to a linear part of the video signal.

Also, the down frame rate conversion unit 202 may be deleted, and the spatial maximum value filter unit 203 and signal adjustment unit 207 may be operated for continuous frames. In this case, a function unit which outputs a low frequency video signal only for each intermittent frame may be arranged between the signal adjustment unit 207 and signal output unit 205. Also, a frame rate can also be converted by calculating an average of even and odd frames. In this manner, various arrangements for setting an output frame rate of low frequency video signals to be lower than that of high frequency video signals are available.

Second Embodiment

Figure 3:
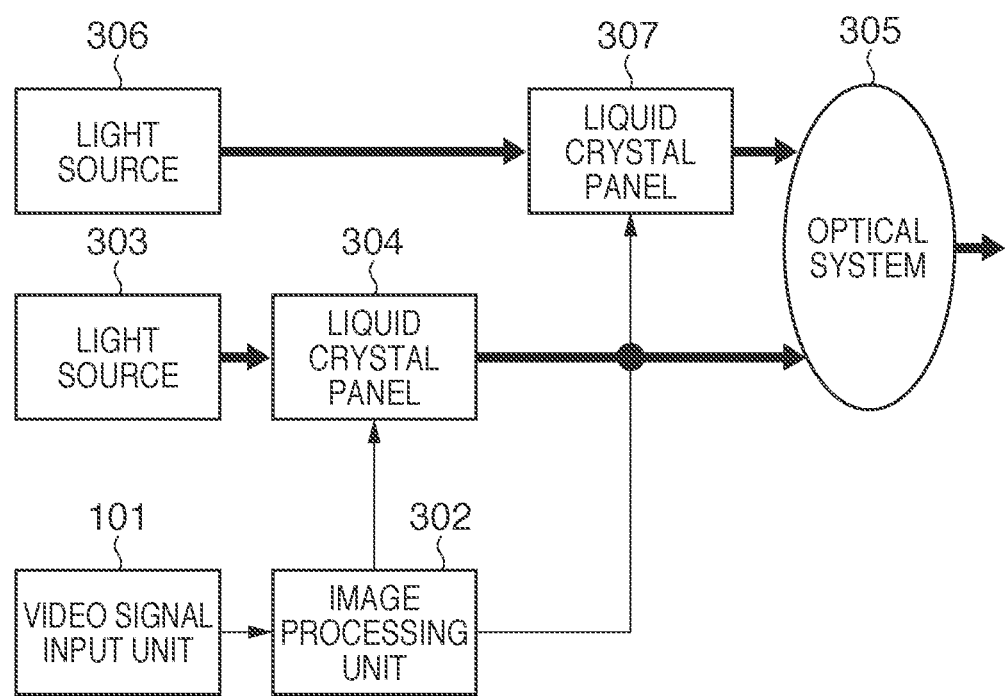
FIG. 3 is a block diagram showing an example of the hardware arrangement of a projector device.

This embodiment will explain a projector device in which light modulation units are juxtaposed. An example of the hardware arrangement of the projector device as an image processing device according to this embodiment will be described first with reference to FIG. 3. Note that the same reference numerals in FIG. 3 denote the same parts as in FIG. 1, and a description thereof will not be repeated. In this embodiment as well, assume that an input frequency to a video signal input unit 101 is 120 Hz for the sake of simplicity. Also, the following description will be given in association with differences from the first embodiment, and points which will be not mentioned in the following description are the same as those in the first embodiment.

An image processing unit 302 separates video signals of respective frames received from the video signal input unit 101 into low and high frequency video signals, outputs the low frequency video signals to a liquid crystal panel 304 at a frequency of 60 Hz, and outputs the high frequency video signals to a liquid crystal panel 307 at a frequency of 120 Hz.

Each of the liquid crystal panels 304 and 307 converts each video signal received from the image processing unit 302 into transmittances for respective pixels. Then, the liquid crystal panel 304 allows light coming from a light source 303 to transmit through itself according to the transmittances calculated by itself. On the other hand, the liquid crystal panel 307 allows light coming from a light source 306 to transmit through itself according to the transmittances calculated by itself. Light components transmitted through the liquid crystal panels 304 and 307 are superposed via an optical system 305 to form an image on a screen.

Figure 4:
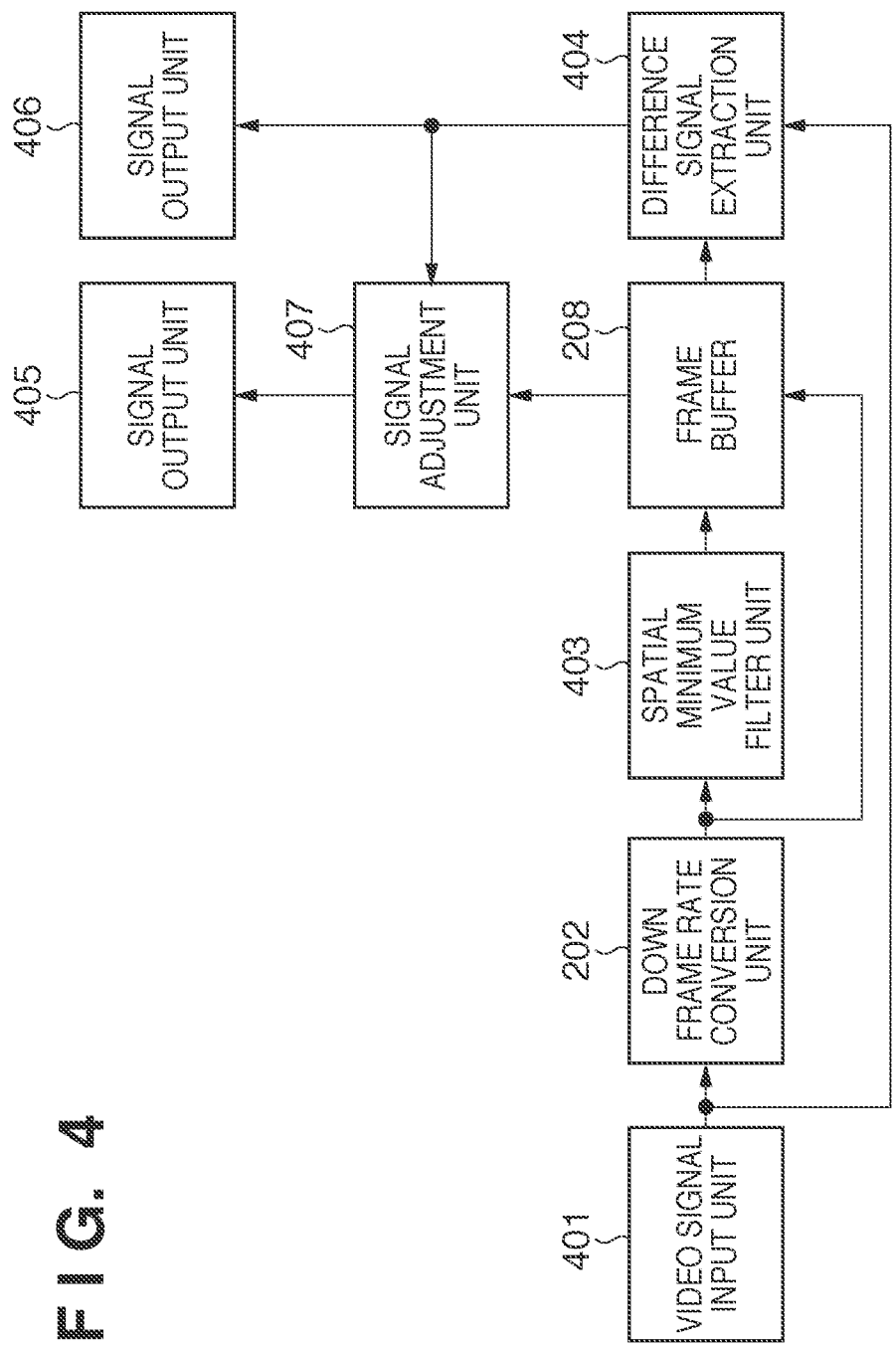
FIG. 4 is a block diagram showing an example of the hardware arrangement of an image processing unit 302.

An example of the hardware arrangement of the image processing unit 302 will be described below with reference to FIG. 4. In this case, assume that the image processing unit 302 receives a video signal for each pixel as in the first embodiment. Alternatively, the image processing unit 302 may receive a video signal in either one of processing units, that is, a video signal for each line or for each region having a predetermined area.

A video signal input unit 401 acquires a video signal I(x, y, t) for each pixel from the video signal input unit 101, and outputs the acquired video signal I(x, y, t) to a subsequent down frame rate conversion unit 202 and difference signal extraction unit 404.

A spatial minimum value filter unit 403 applies a known minimum value filter (for example, a minimum value filter having a 5×5 size) to the video signal I(x, y, t) received from the down frame rate conversion unit 202. Thus, the spatial minimum value filter unit 403 generates a low frequency video signal Lm(x, y, t) by removing high frequency components from this video signal I(x, y, t). Then, the spatial minimum value filter unit 403 stores the generated low frequency video signal Lm(x, y, t) in a subsequent frame buffer 208.

The difference signal extraction unit 404 calculates equation (3) below using the video signal I(x, y, t) received from the video signal input unit 401 and a [low frequency video signal Lm(x, y, t') in a frame t' closest to a frame t] stored in the frame buffer 208:

$$H_m(x,y,t)=\text{Min}(1,2\times I(x,y,t)-L_m(x,y,t')) \qquad (3)$$

In this case, when t assumes an even value, t'=t (the same frame); when t assumes an odd value, t'=t−1 (one frame before). According to this equation (3), a result (difference value) is calculated by subtracting a signal value of the low frequency video signal Lm(x, y, t') stored in the frame buffer 208 from a signal value which is twice that of the video signal I(x, y, t). Then, the calculated difference value is compared with a value "1", and a smaller value is used as a signal value of a high frequency video signal Hm(x, y, t).

In this way, equation (3) calculates a signal value of the high frequency video signal Hm(x, y, t) by making a difference calculation between the signals, and suppresses the difference calculation result (the signal value of the high frequency video signal Hm(x, y, t)) from overflowing. Note that an equation used to calculate the difference value is not limited to equation (3).

Then, the difference signal extraction unit 404 outputs the high frequency video signal Hm(x, y, t) having the signal value calculated based on equation (3) to a subsequent signal output unit 406 and signal adjustment unit 407.

The signal adjustment unit 407 calculates equation (4) below using a [video signal I(x, y, t") in a frame t"] stored in the frame buffer 208 and a high frequency video signal Hm(x, y, t") from the difference signal extraction unit 404:

$$L_m'(x,y,t'')=2\times I(x,y,t'')-H_m(x,y,t'') \qquad (4)$$

In this case, t" assumes an even value. Equation (4) calculates a difference value by subtracting a signal value of the high frequency video signal Hm(x, y, t") from a signal value which is twice that of the video signal I(x, y, t") in an even frame, so as to calculate an adjusted low frequency video signal Lm'(x, y, t") having the calculated difference value as a signal value. More generally, equation (4) calculates a difference value by subtracting a signal value of a high frequency video signal of an intermittent frame from a signal value, which is twice that of a video signal of the intermittent frame, thus generating an adjusted low frequency video signal having the calculated difference value as a signal value as a video signal in the intermittent frame. This equation (4) distributes a luminance value of the high frequency video signal side, which is decreased due to the above overflow suppression, to the low frequency video signal side.

Then, the signal adjustment unit 407 outputs the calculated low frequency video signal Lm'(x, y, t") to a signal output unit 405. As is apparent from the above description, in this embodiment as well, a ratio of a frame rate of high frequency video signals to that of low frequency video signals is 2:1 as in the first embodiment.

The signal output units 405 and 406 operate in synchronism with each other for respective frames. When t assumes an even value, the signal output unit 405 outputs a signal Lm'(x, y, t), and the signal output unit 406 outputs a signal Hm(x, y, t) at the same time. On the other hand, when t assumes an odd value, the signal output unit 405 outputs nothing, and the signal output unit 406 outputs a signal Hm(x, y, t). An output destination of the signal output unit 405 is the liquid crystal panel 304, and that of the signal output unit 406 is the liquid crystal panel 307.

As described above, according to this embodiment, a luminance change on the liquid crystal panel 304 is reduced, and the dynamic characteristics of a projected image caused by low response characteristics of the liquid crystal panel 304 can be suppressed from lowering. Also, since high frequency signals are collected in signals for one liquid crystal panel, a luminance variation becomes large, and the response characteristics of the liquid crystal panel 307 driven by high frequency signals can be improved. For this reason, two images are composited to improve projected luminance characteristics, and the dynamic characteristics of a projected video can be simultaneously improved.

This embodiment has explained the input frequency as 120 Hz. Of course, an input frequency of, for example, 100 Hz or 60 Hz may be used. A frame rate up-converter may be arranged between the video signal input unit 101 and image processing unit 302, and a video signal which is input to the video signal input unit 101 at an input frequency of 60 Hz may be converted into a video signal of 120 Hz by this frame rate up-converter.

In this embodiment, the spatial minimum value filter unit 403 generates a low frequency video signal using the minimum value filter. However, a method of generating a low frequency video signal is not limited to this. For example, a low frequency video signal may be generated using a method of converting a resolution to a lower resolution or convolving a Gaussian kernel. Also, the present invention is not limited to generation of spatial low frequency components, and low frequency components may be generated by applying a filter in a time direction.

Equations (3) and (4) above are designed under the assumption that a video signal has a linear nature. Therefore, when a video signal has a nonlinear nature, these equations (3) and (4) may be applied to a linear part of the video signal.

In this embodiment, the liquid crystal panels 304 and 307 share the optical system 305. However, independent optical systems may be arranged for the liquid crystal panels 304 and 307. In this case, the respective optical systems have to be configured to composite light components coming from the respective liquid crystal panels into one video, and to form it on the screen. Also, output signals (high and low frequency video signals) from the image processing unit 302 may be output to two independent projector devices, and projected images may be superposed.

Also, the down frame rate conversion unit 202 may be deleted, and the spatial minimum value filter unit 403 and signal adjustment unit 407 may be operated for continuous frames. In this case, a function unit which outputs a low frequency video signal only for each intermittent frame may be arranged between the signal adjustment unit 407 and signal output unit 405. Also, a frame rate can also be converted by calculating an average of even and odd frames. In this manner, various arrangements for setting an output frame rate of low frequency video signals to be lower than that of high frequency video signals are made available.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-123296 filed May 28, 2010 which is hereby incorporated by reference herein in its entirety.

What is claimed is:

1. An image display device, which forms, on a screen, an image displayed on a first display panel and an image displayed on a second display panel superposed with each other, comprising:
    an acquisition unit configured to acquire a video signal of successive respective frames;
    a frame rate converting unit configured to perform frame-rate-convert-processing for outputting intermittent frames whose frame rate is lower than that of the successive respective frames;
    a first generation unit configured to generate a low frequency video signal of the intermittent frames;
    a second generation unit configured to calculate a ratio of a signal value of a video signal of an acquired frame acquired by said acquisition unit to a signal value of the low frequency video signal of an intermittent frame, wherein the intermittent frame is every other frame of the successive respective frames, to generate a high frequency video signal having a signal value based on the calculated ratio, and to output the generated high frequency video signal to the first display panel; and
    a third generation unit configured to calculate a ratio of a signal value of the video signal of the intermittent frame to a signal value of the high frequency video signal of the intermittent frame, to generate an adjusted low frequency video signal having a signal value based on the calculated ratio, and to output the generated adjusted low frequency video signal to the second display panel.

2. The device according to claim 1, wherein said first generation unit generates the low frequency video signal of the intermittent frame by applying a maximum value filter to the video signal of the intermittent frame.

3. The device according to claim 1, wherein said second generation unit calculates a ratio of a signal value of a video signal of an even frame to a signal value of a low frequency video signal generated by said first generation unit for the even frame, and generates, as a high frequency video signal of the even frame, a signal having a smaller value of the calculated ratio and a value "1" as a signal value.

4. The device according to claim 3, wherein when the signal value of the low frequency video signal used to calculate the ratio is zero, said second generation unit generates a high frequency video signal having zero as a signal value.

5. The device according to claim 1, wherein said second generation unit calculates a ratio of a signal value of a video signal of an odd frame to a signal value of a low frequency video signal generated by said first generation unit for a frame one frame before the odd frame, and generates, as a high frequency video signal of the odd frame, a signal having a smaller value of the calculated ratio and a value "1" as a signal value.

6. The device according to claim 1, wherein said first generation unit, said second generation unit, and said third generation unit execute processing on a pixel unit, a line unit, or a region unit having a predetermined area.

7. The device according to claim 1, wherein the first display panel and the second display panel include one of a transmission type liquid crystal panel, a reflection type liquid crystal panel, and a digital micromirror device.

8. An image display method executed by an image display device, which forms, on a screen, an image displayed on a first display panel and an image displayed on a second display panel superposed with each other, comprising:
   an acquisition step of acquiring a video signal of successive respective frames;
   a frame rate converting step of performing frame-rate-convert-processing for outputting intermittent frames whose frame rate is lower than that of the successive respective frames;
   a first generation step of generating a low frequency video signal of intermittent frames obtained by down-frame-rate-converting the successive respective frames;
   a second generation step of calculating a ratio of a signal value of a video signal of an acquired frame acquired in the acquisition step to a signal value of the low frequency video signal of the intermittent frame, wherein the intermittent frame is every other frame of the successive respective frames, generating a high frequency video signal having a signal value based on the calculated ratio, and outputting the generated high frequency video signal to the first display panel; and
   a third generation step of calculating a ratio of a signal value of the video signal of the intermittent frame to a signal value of the high frequency video signal of the intermittent frame, generating an adjusted low frequency video signal having a signal value based on the calculated ratio, and outputting the generated adjusted low frequency video signal to the second display panel.

9. A non-transitory computer-readable storage medium storing a computer program for controlling a computer to execute respective steps of an image display method according to claim 8.

10. An image display device, which forms, on a screen, an image displayed on a first display panel and an image displayed on a second display panel superposed with each other, the image display device comprising:
   an acquisition unit configured to acquire a video signal of successive respective frames;
   a frame rate converting unit configured to perform frame-rate-convert-processing for outputting intermittent frames whose frame rate is lower than that of the successive respective frames;
   a generation unit configured to generate a low frequency video signal of the intermittent frames by applying filter processing to video signals of the intermittent frames, and to generate a high frequency video signal based on a signal value of the video signal of an acquired frame and a signal value of the low frequency video signal of the intermittent frame, wherein the intermittent frames are every other frame of the successive respective frames; and
   an output unit configured to output the low frequency video signal to the first display panel, and to output the high frequency video signal to the second display panel,
   wherein a frame rate of the high frequency video signal is higher than that of the low frequency video signal.

11. An image display method executed by an image display device, which forms, on a screen, an image displayed on a first display panel and an image displayed on a second display panel superposed with each other, the image display method comprising:
   an acquisition step of acquiring a video signal of successive respective frames;
   a frame rate converting step of performing frame-rate-convert-processing for outputting intermittent frames whose frame rate is lower than that of the successive respective frames;
   a generation step of generating a low frequency video signal of the intermittent frames by applying filter processing to video signals of the intermittent frames, high frequency video signal based on a signal value of the video signal of an acquired frame and a signal value of the low frequency video signal of the intermittent frame, wherein the intermittent frames are every other frame of the successive respective frames; and
   an output step of outputting the low frequency video signal to the first display panel, and of outputting the high frequency video signal to the second display panel,
   wherein a frame rate of the high frequency video signal is higher than that of the low frequency video signal.

12. A non-transitory computer-readable storage medium storing a computer program for controlling a computer to execute respective steps of an image display method according to claim 11.

* * * * *